United States Patent
Ko et al.

(10) Patent No.: US 10,388,459 B2
(45) Date of Patent: Aug. 20, 2019

(54) MULTILAYER ELECTRONIC COMPONENT

(71) Applicant: SAMSUNG ELECTRO-MECHANICS CO., LTD., Suwon-si, Gyeonggi-do (KR)

(72) Inventors: Gyoung Heon Ko, Suwon-si (KR); Young Jong Yoo, Suwon-si (KR); Jea Hoon Lee, Suwon-si (KR); Yeo Ju Cho, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/876,969

(22) Filed: Jan. 22, 2018

(65) Prior Publication Data

US 2018/0286592 A1 Oct. 4, 2018

(30) Foreign Application Priority Data

Apr. 4, 2017 (KR) .......... 10-2017-0043880
Jun. 23, 2017 (KR) .......... 10-2017-0079430

(51) Int. Cl.
*H01G 4/30* (2006.01)
*H01G 4/228* (2006.01)
*H01G 4/232* (2006.01)
*H01G 4/005* (2006.01)
*H01G 4/012* (2006.01)
*H01G 4/12* (2006.01)

(52) U.S. Cl.
CPC ............ *H01G 4/30* (2013.01); *H01G 4/005* (2013.01); *H01G 4/012* (2013.01); *H01G 4/232* (2013.01); *H01G 4/12* (2013.01)

(58) Field of Classification Search
CPC .......... H01G 4/30; H01G 4/232; H01G 4/228; H01G 4/005
USPC ............ 361/303, 321.1, 301.4, 321.2, 306.1, 361/306.3
See application file for complete search history.

(56) References Cited

U.S. PATENT DOCUMENTS

2009/0135543 A1  5/2009  Togashi et al.

FOREIGN PATENT DOCUMENTS

JP  2006-147793 A  6/2006
JP  2009-130219 A  6/2009

*Primary Examiner* — Eric W Thomas
*Assistant Examiner* — Arun Ramaswamy
(74) *Attorney, Agent, or Firm* — Morgan Lewis & Bockius LLP

(57) ABSTRACT

A multilayer electronic component has a structure in which an internal electrode connected to a positive (+) terminal of a circuit and an internal electrode connected to a ground of the circuit are implemented together on one dielectric layer and external electrodes commonly use a multi-terminal connected to the ground of the circuit.

8 Claims, 3 Drawing Sheets

MULTILAYER ELECTRONIC COMPONENT

CROSS-REFERENCE TO RELATED APPLICATION(S)

This application claims the benefit of priority to Korean Patent Application Nos. 10-2017-0043880 filed on Apr. 4, 2017 and 10-2017-0079430 filed on Jun. 23, 2017 in the Korean Intellectual Property Office, the disclosures of which are incorporated herein by reference in their entirety.

TECHNICAL FIELD

The present disclosure relates to a multilayer electronic component.

BACKGROUND

In accordance with the technological advancement of smartphones, amounts of current consumed by smartphones have increased significantly, while the sizes of the batteries of smartphones have increased and the sizes of main printed circuit boards (PCBs) of smartphones have gradually decreased in order to cope with the increase in the amount consumed current.

Due to such a background, smartphone developers have required passive elements having a small size. In addition, in accordance with the increase in amounts of consumed current, the numbers of multilayer ceramic capacitors (MLCCs) used in smartphones have also increased.

An interval between electrodes may be excessively reduced due to an increase in the numbers of miniaturized main PCBs and small passive components that are used as described above, such that a defect such as a short circuit between the electrodes may frequently occur. Therefore, a method of reducing a defect such as a short circuit between the electrodes while reducing a size of the MLCC has been required.

SUMMARY

An aspect of the present disclosure may provide a multilayer electronic component in which parasitic capacitance may be reduced and a plurality of capacitor portions may be implemented as a single component.

According to an aspect of the present disclosure, a multilayer electronic component may include: a capacitor body including first and second dielectric layers alternately disposed, first and second internal electrodes disposed on the first dielectric layers to be spaced apart from each other, and third and fourth internal electrodes disposed on the second dielectric layers to be spaced apart from each other. The capacitor body has first and second surfaces opposing each other, third and fourth surfaces connecting the first and second surfaces to each other and opposing each other, and fifth and sixth surfaces connecting the first and second surfaces to each other, connecting the third and fourth surfaces to each other, and opposing each other. The multilayer electronic component further includes a first external electrode disposed on the third surface of the capacitor body and electrically connected to the first internal electrodes; a second external electrode disposed on the fourth surface of the capacitor body and electrically connected to the third internal electrodes; and third and fourth external electrodes disposed on the fifth and sixth surfaces of the capacitor body, respectively, and electrically connected to the second and fourth internal electrodes. The capacitor body includes a first capacitor portion formed of a region in which the first and third internal electrodes overlap each other and a second capacitor portion formed of a region in which the second and fourth internal electrodes overlap each other, and the first capacitor portion and the second capacitor portion have different capacitances.

End portions of the second internal electrodes and the fourth internal electrodes facing each other may be disposed to be in contact with the same line in a stacking direction.

The first internal electrodes may be exposed through the third surface of the capacitor body. The second internal electrodes may be exposed through the fifth and sixth surfaces of the capacitor body. The third internal electrodes may be exposed through the fourth surface of the capacitor body. The fourth internal electrodes maybe exposed through the fifth and sixth surfaces of the capacitor body.

Widths of the first and third internal electrodes may be smaller than those of the second and fourth internal electrodes.

The second internal electrode may include a first body portion overlapping the third internal electrode and spaced apart from an edge of the capacitor body and first and second lead portions extended from the first body portion to be exposed through the fifth and sixth surfaces of the capacitor body, respectively. The fourth internal electrode may include a second body portion overlapping the first internal electrode and spaced apart from an edge of the capacitor body and third and fourth lead portions extended from the second body portion to be exposed through the fifth and sixth surfaces of the capacitor body, respectively.

An interval between the first internal electrode and the second internal electrode and an interval between the third internal electrode and the fourth internal electrode may be 50 μm or more.

The first external electrode may be extended from the third surface of the capacitor body to portions of the first and second surfaces of the capacitor body. The second external electrode may be extended from the fourth surface of the capacitor body to portions of the first and second surfaces of the capacitor body.

The first external electrode may be extended from the third surface of the capacitor body to portions of the fifth and sixth surfaces of the capacitor body. The second external electrode may be extended from the fourth surface of the capacitor body to portions of the fifth and sixth surfaces of the capacitor body.

The third external electrode may be extended from the fifth surface of the capacitor body to portions of the first and second surfaces of the capacitor body. The fourth external electrode may be extended from the sixth surface of the capacitor body to portions of the first and second surfaces of the capacitor body.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
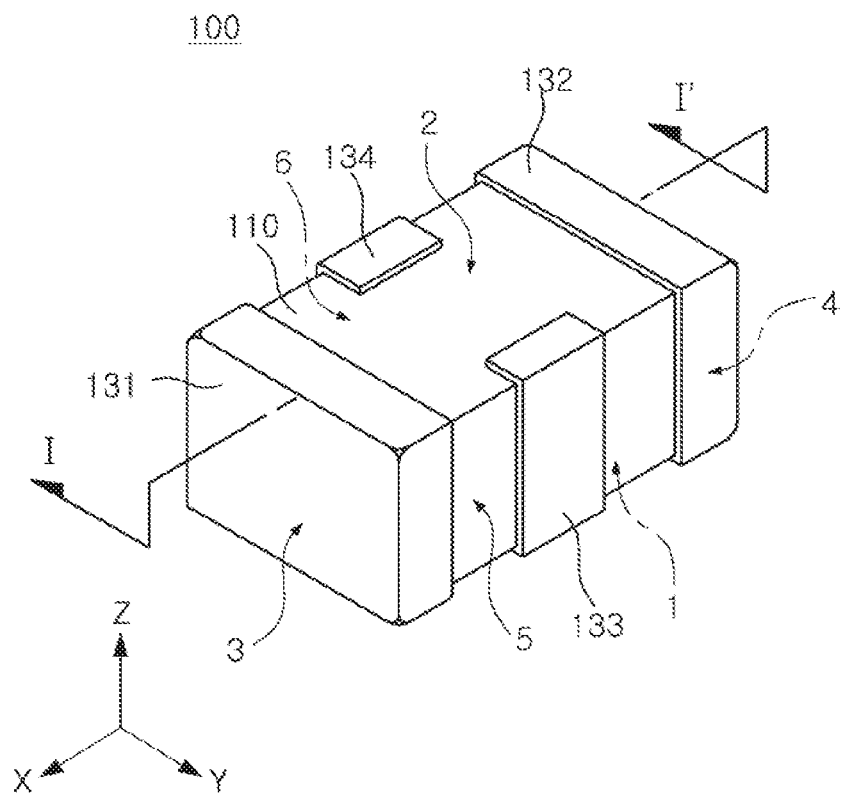
FIG. 1 is a perspective view illustrating a multilayer electronic component according to an embodiment in the present disclosure.

Hereinafter, embodiments of the present disclosure will be described in detail with reference to the accompanying drawings. In the accompanying drawings, shapes, sizes and the like, of the components may be exaggerated or shortened for clarity.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being 'on,' 'connected to,' or 'coupled to' another element, it can be directly 'on,' 'connected to,' or 'coupled to' the other element or other elements intervening therebetween may be present. In contrast, when an element is referred to as being 'directly on,' 'directly connected to,' or 'directly coupled to' another element, there may be no other elements or layers intervening therebetween. Like numerals refer to like elements throughout. As used herein, the term 'and/or' includes any and all combinations of one or more of the associated listed items.

It will be apparent that although the terms first, second, third, etc. may be used herein to describe various members, components, regions, layers and/or sections, any such members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as 'above,' 'upper,' 'below,' and 'lower' and the like, may be used herein for ease of description to describe one element's relationship relative to another element(s) as shown in the figures. It will be understood that spatially relative terms are intended to encompass different orientations of the device in use or operation, in addition to the orientation depicted in the figures. For example, if the device in the figures is turned over, elements described as 'above,' or 'upper' relative to other elements would then be oriented 'below,' or 'lower' relative to the other elements or features. Thus, the term 'above' can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms 'a,' 'an,' and 'the' are intended to include the plural forms as well, unless the context clearly indicates otherwise. It will be further understood that the terms 'comprises,' and/or 'comprising' when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted alone, in combination or in partial combination.

The contents of the present disclosure described below may have a variety of configurations and propose only a required configuration herein, but are not limited thereto.

A multilayer electronic component according to an embodiment in the present disclosure may have a structure in which an internal electrode connected to a positive (+) terminal of a circuit and an internal electrode connected to a ground of the circuit are implemented together on one dielectric layer and external electrodes commonly use a multi-terminal connected to the ground of the circuit.

Figure 2:
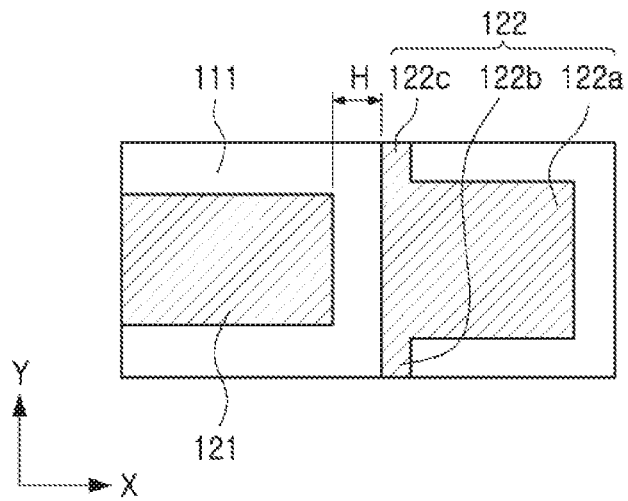
FIG. 2 is a plan view illustrating a first dielectric layer and first and second internal electrodes in FIG. 1.
Figure 3:
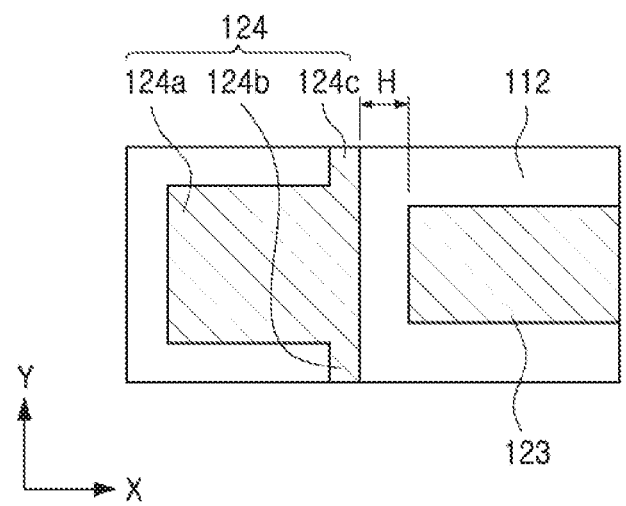
FIG. 3 is a plan view illustrating a second dielectric layer and third and fourth internal electrodes in FIG. 1.
Figure 4:
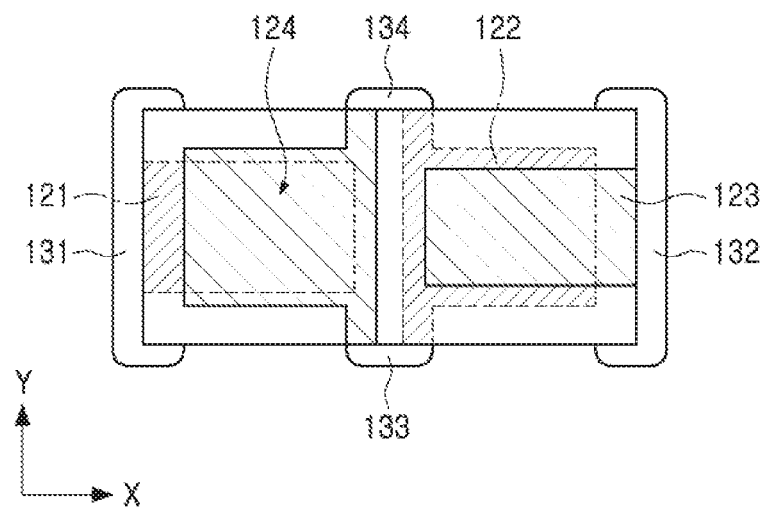
FIG. 4 is a plan view illustrating that the first dielectric layer of FIG. 2 and the second dielectric layer of FIG. 3 overlap each other.
Figure 5:
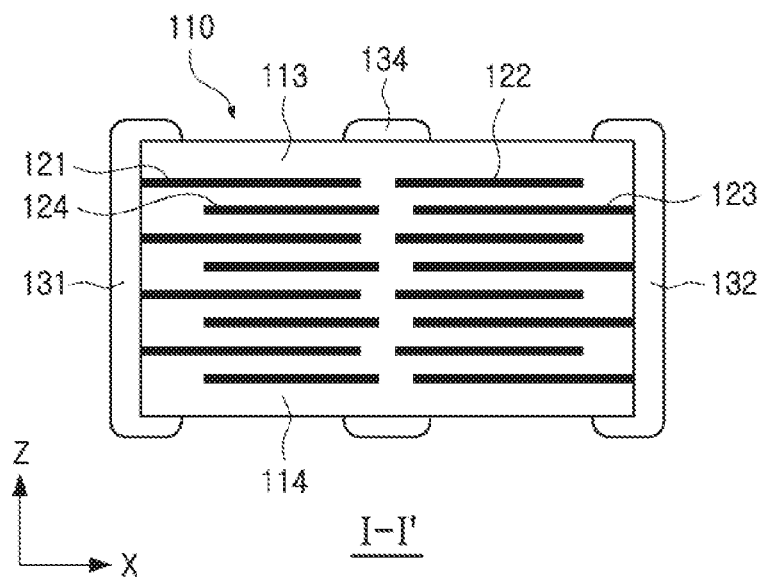
FIG. 5 is a cross-sectional view taken along line I-I' of FIG. 1.

FIG. 1 is a perspective view illustrating a multilayer electronic component according to an embodiment in the present disclosure. FIG. 2 is a plan view illustrating a first dielectric layer and first and second internal electrodes in FIG. 1. FIG. 3 is a plan view illustrating a second dielectric layer and third and fourth internal electrodes in FIG. 1. FIG. 4 is a plan view illustrating that the first dielectric layer of FIG. 2 and the second dielectric layer of FIG. 3 overlap each other. FIG. 5 is a cross-sectional view taken along line I-I' of FIG. 1.

Referring to FIGS. 1 through 5, in a multilayer electronic component 100 according to the present embodiment, internal electrodes having different shapes may be implemented on one dielectric layer to implement first and second capacitor portions corresponding to the respective separated multilayer ceramic capacitors (MLCCs) in a single capacitor body 110. In this case, the first and second capacitor portions may be independently operated.

Directions of the capacitor body 110 will be defined in order to clearly describe embodiments in the present disclosure. X, Y and Z in the drawings refer to a length direction, a width direction, and a thickness direction, respectively. Here, the thickness direction refers to a stacking direction in which dielectric layers are stacked.

The capacitor body 110 includes a plurality of first and second dielectric layers 111 and 112 and a plurality of first to fourth internal electrodes 121 to 124. The first and second dielectric layers 111 and 112 are alternately disposed in the Z direction.

The first and second dielectric layers 111 and 112 may include a ceramic material having a high dielectric constant, for example, barium titanate ($BaTiO_3$) based ceramic powder particles, or the like. However, a material of each of the first and second dielectric layers 111 and 112 is not limited thereto as long as a sufficient capacitance may be obtained.

In addition, the first and second dielectric layers 111 and 112 may further include various kinds of ceramic additives such as a transition metal oxide or carbide, rare earth elements, magnesium (Mg), aluminum (Al), or the like, organic solvents, plasticizers, binders, dispersants, and the like, if necessary, in addition to the ceramic powder particles.

Hereinafter, a first capacitor portion refers to a portion in which the first and fourth internal electrodes 121 and 124 overlap each other in the Z direction in the capacitor body 110, and a second capacitor portion refers to a portion in which the second and third internal electrodes 122 and 123 overlap each other in the Z direction in the capacitor body 110.

In addition, the capacitor body 110 has first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connecting the first and second surfaces 1 and 2 to each other, connecting the third and fourth surfaces 3 and 4 to each other, and opposing each other in the Y direction.

In a cross section of the multilayer electronic component 100 in the length (X) direction and the thickness (Z) direction, a margin portion refers to a portion except for an active region in which internal electrodes are disposed. In the margin portion, an upper margin portion and a lower margin portion of the active region in the Z direction refer particularly to an upper cover 113 and a lower cover 114, respectively.

The upper cover 113 and the lower cover 114 may be formed by sintering ceramic green sheets, similar to the first or second dielectric layer 111 or 112 disposed in the active region.

The first and second internal electrodes 121 and 122 are formed on the first dielectric layer 111 to be spaced apart from each other in the X direction. One end of the first internal electrode 121 is exposed through the third surface 3 of the capacitor body 110. The first internal electrode 121 may serve as a signal terminal.

The second internal electrode 122 includes a first body portion 122a and first and second lead portions 122b and 122c. The second internal electrode 122 may serve as a ground terminal.

Here, the first body portion 122a may be a portion disposed on the first dielectric layer 111 to be spaced apart from the first internal electrode 121 by a predetermined interval H in the X direction.

The first and second lead portions 122b and 122c may be portions extended from the first body portion 122a to be exposed through the fifth and sixth surfaces 5 and 6 of the capacitor body 110, respectively.

According to such a structure, the second internal electrode 122 may generally have a T shape.

The third and fourth internal electrodes 123 and 124 are formed on the second dielectric layer 112 to be spaced apart from each other in the X direction.

One end of the third internal electrode 123 is exposed through the fourth surface 4 of the capacitor body 110. The third internal electrode 123 may serve as a signal terminal.

In addition, a portion of the third internal electrode 123 overlaps the first body portion 122a of the second internal electrode 122 in the Z direction. In addition, the third internal electrode 123 is disposed to be spaced apart from the first internal electrode 121 in the X direction in the capacitor body 110.

The fourth internal electrode 124 includes a second body portion 124a and third and fourth lead portions 124b and 124c. The fourth internal electrode 124 may serve as a ground terminal.

In addition, a portion of the fourth internal electrode 124 overlaps the first internal electrode 121. In addition, the fourth internal electrode 124 is disposed to be spaced apart from the second internal electrode 122 in the X direction in the capacitor body 110.

The second body portion 124a is a portion disposed on the second dielectric layer 112 to be spaced apart from the third internal electrode 123 by a predetermined interval H in the X direction. The second body portion 124a overlaps a portion of the first internal electrode 121 in the Z direction.

The third and fourth lead portions 124b and 124c are portions extended from the second body portion 124a to be exposed through the fifth and sixth surfaces 5 and 6 of the capacitor body 110, respectively.

According to such a structure, the fourth internal electrode 124 may generally have a T shape.

When the interval H between the first internal electrode 121 and the second internal electrode 122 and the interval H between the third internal electrode 123 and the fourth internal electrode 124 are increased, crosstalk between the first capacitor portion and the second capacitor portion may be significantly reduced, but it may become difficult to implement capacitances.

In the present embodiment, a minimum value of H at which capacitances of the first and second capacitor portions are not reduced may be 50 μm.

When the interval between the first internal electrode 121 and the second internal electrode 122 is less than 50 μm or the interval between the third internal electrode 123 and the fourth internal electrode 124 is less than 50 μm, crosstalk may be generated between the first capacitor portion and the second capacitor portion.

In addition, the first to fourth internal electrodes 121 to 124 may be formed of a conductive metal, for example, any one of silver (Ag), palladium (Pd), platinum (Pt), nickel (Ni), and copper (Cu), or alloys thereof. However, a material of each of the first to fourth internal electrodes 121 to 124 is not limited thereto.

In the present embodiment, when areas of the first internal electrode 121 and the third internal electrode 123 are formed to be the same as each other, areas of the second internal electrode 122 and the fourth internal electrode 124 are formed to be the same as each other, and sizes of an area in which the first internal electrode 121 and the fourth internal electrode 124 overlap each other and an area in which the second internal electrode 122 and the third internal electrode 123 overlap each other are formed to be the same as each other, capacitances of the first capacitor portion and the second capacitor portion may be formed to be the same as each other.

As another example, when areas of the first internal electrode 121 and the third internal electrode 123 are formed to be different from each other or areas of the second internal electrode 122 and the fourth internal electrode 124 are formed to be different from each other, and sizes of an area in which the first internal electrode 121 and the fourth internal electrode 124 overlap each other and an area in which the second internal electrode 122 and the third internal electrode 123 overlap each other are formed to be different from each other, capacitance of the first capacitor portion and the second capacitor portion may be formed to be different from each other.

Referring to FIG. 4, a width of the second body portion 124a of the fourth internal electrode 124 may be greater than that of the first internal electrode 121. Therefore, a portion of the second body portion 124*a* of the fourth internal electrode 124 may not overlap the first internal electrode 121.

In addition, a width of the first body portion 122*a* of the second internal electrode 122 may be greater that of the third internal electrode 123. Therefore, a portion of the first body portion 122*a* of the second internal electrode 122 may not overlap the third internal electrode 123.

Meanwhile, in the present embodiment, as illustrated in FIG. 5, a front end of the second internal electrode 122 may be disposed to be spaced apart from a front end of the fourth internal electrode 124 in the X direction.

Figure 6:
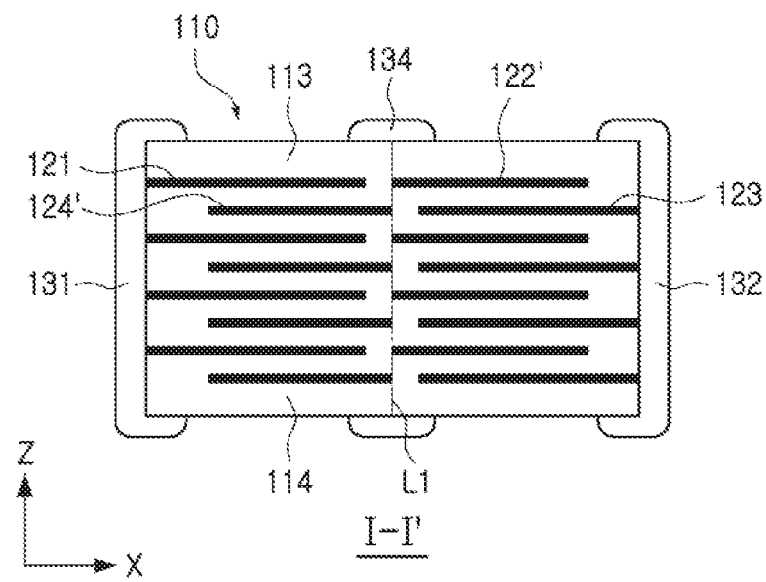
FIG. 6 is a cross-sectional view of a multilayer electronic component according to another embodiment in the present disclosure taken along line I-I' of FIG. 1.

However, as illustrated in FIG. 6, according to another embodiment in the present disclosure, when a virtual line L1 is drawn in the Z direction, a front end of a second internal electrode 122' and a front end of a fourth internal electrode 124' may be disposed to be in contact with the virtual line L1.

According to the present embodiment, the multilayer electronic component 100 includes first to fourth external electrodes 131 to 134.

The first external electrode 131 is formed on the third surface 3 of the capacitor body 110.

In this case, the first external electrode 131 may be extended to portions of the first and second surfaces 1 and 2 of the capacitor body 110.

In addition, the first external electrode 131 may be extended to portions of the fifth and sixth surfaces 5 and 6 of the capacitor body 110.

In addition, portions of the first internal electrode 121 exposed through the third surface 3 of the capacitor body 110 may be electrically connected to the first external electrode 131.

The second external electrode 132 may be formed on the fourth surface 4 of the capacitor body 110.

In this case, the second external electrode 132 may be extended to portions of the first and second surfaces 1 and 2 of the capacitor body 110.

In addition, the second external electrode 132 may be extended to portions of the fifth and sixth surfaces 5 and 6 of the capacitor body 110.

In addition, portions of the third internal electrode 123 exposed through the fourth surface 4 of the capacitor body 110 may be electrically connected to the second external electrode 132.

The third external electrode 133 may be formed on the fifth surface 5 of the capacitor body 110.

In this case, the third external electrode 133 may be extended to portions of the first and second surfaces 1 and 2 of the capacitor body 110.

The exposed portions of the first lead portions 122*b* of the second internal electrodes 122. The exposed portions of the third lead portions 124*b* of the fourth internal electrode 124 may be electrically connected to the third external electrode 133.

The fourth external electrode 134 may be formed on the sixth surface 6 of the capacitor body 110.

In this case, the fourth external electrode 134 may be extended to portions of the first and second surfaces 1 and 2 of the capacitor body 110.

The exposed portions of the second lead portion 122*c* of the second internal electrodes 122. The exposed portions of the fourth lead portions 124*c* of the fourth internal electrode 124 may be electrically connected to the fourth external electrode 134.

In addition, the first to fourth external electrodes 131 to 134 may be formed of a conductive metal, for example, silver (Ag), nickel (Ni), copper (Cu), or the like.

The first to fourth external electrodes 131 to 134 may be formed by applying and then firing a conductive paste prepared by adding glass frit to conductive metal powder particles. However, the first to fourth external electrodes 131 to 134 are not limited thereto.

In addition, a plating layer (not shown) may be formed on each of the first to fourth external electrodes 131 to 134, if necessary. The plating layer may increase adhesion strength between the multilayer electronic component 100 and a board when the multilayer electronic component 100 is mounted on the board using solders.

An array multilayer electronic component according to the related art has a structure in which a plurality of first and second external electrodes are disposed on opposite surfaces of a capacitor body opposing each other.

In this case, a plurality of first internal electrodes, respectively connected to the plurality of first external electrodes disposed on one surface of the capacitor body, may be disposed at predetermined intervals on first dielectric layers.

In addition, a plurality of second internal electrodes, respectively connected to the plurality of second external electrodes disposed on the other surface of the capacitor body opposing one surface of the capacitor body, may be disposed at predetermined intervals on second dielectric layers.

Therefore, the array multilayer electronic component according to the related art has a structure in which a plurality of capacitor portions are implemented in a single capacitor body.

In order to form the plurality of capacitor portions in a single capacitor body as described above, an interval between the internal electrodes needs to be sufficiently large.

When the interval between the internal electrodes is excessively small, crosstalk is generated between the internal electrodes, such that parasitic capacitance may be formed.

Since the parasitic capacitance formed as described above may not separate adjacently disposed capacitor portions from each other, when noise is generated, the noise may have an influence on both of the adjacent capacitor portions.

Therefore, in order to separate the adjacent capacitor portions from each other, an interval between the internal electrodes adjacent to each other on one dielectric layer needs to be sufficiently secured.

However, in the array multilayer electronic component according to the related art in which all the internal electrodes have the same shape, when external electrodes are disposed in order to sufficiently secure the interval between the internal electrodes, an interval between the external electrodes becomes similar to that of a case in which several multilayer capacitors are stacked, and an effect of efficiently using an area occupied by a component when a product is implemented in an array form is thus reduced.

In the present embodiment, the first and second external electrodes 131 and 132 may serve as terminals connected to a positive (+) terminal of a circuit, and the third and fourth external electrodes 133 and 134 may serve as terminals connected to a ground (GND) of the circuit.

In this case, the third and fourth external electrodes 133 and 134 may be used by the second and the fourth internal electrodes 122 and 124 in common.

In addition, the first internal electrode 121 connected to the first external electrode 131 and the second internal electrode 122 connected to the third and fourth external electrodes 133 and 134 may be disposed together on the first dielectric layer 111.

In addition, the third internal electrode 123 connected to the second external electrode 132 and the fourth internal electrode 124 connected to the third and fourth external electrodes 133 and 134 may be disposed together on the second dielectric layer 112.

That is, the multilayer electronic component 100 according to the present embodiment may have a structure in which the internal electrode connected to the positive (+) terminal of the circuit and the internal electrode connected to the ground of the circuit are implemented together on one dielectric layer and the external electrodes may commonly use the multi-terminal connected to the ground of the circuit.

Therefore, the internal electrodes connected to the positive (+) terminal of the circuit may be alternately disposed to be offset from each other in the stacking direction to increase an interval between the two internal electrodes.

Therefore, parasitic capacitance generated between the respective capacitor portions maybe significantly reduced, and two independent capacitor portions may be implemented in a single capacitor body.

In this case, one of the two internal electrodes disposed on the same dielectric layer may be connected to the positive (+) terminal of the circuit and the other of the two internal electrodes may be connected to the ground. Therefore, the parasitic capacitance may not be generated between the two internal electrodes.

In addition, in such a structure, a common ground terminal may be formed at a central portion of the capacitor body 110, and two capacitor portions may thus be implemented in the capacitor body having a smaller area.

As set forth above, according to the embodiments in the present disclosure, an internal electrode corresponding to a signal pattern and an internal electrode corresponding to a ground pattern may be formed together on one dielectric layer, the internal electrode corresponding to the signal pattern and the internal electrode corresponding to the ground pattern may be formed in different shapes to significantly reduce parasitic capacitance of the multilayer electronic component, reduce a size of a capacitor body, implement a plurality of independent capacitor portions as one component, resulting in reduction in an area of a component mounted on a board.

While embodiments have been shown and described above, it will be apparent to those skilled in the art that modifications and variations could be made without departing from the scope of the present disclosure as defined by the appended claims.

What is claimed is:

1. A multilayer electronic component comprising:
a capacitor body including first and second dielectric layers alternately disposed, first and second internal electrodes disposed on the first dielectric layers to be spaced apart from each other, and third and fourth internal electrodes disposed on the second dielectric layers to be spaced apart from each other, the capacitor body having first and second surfaces opposing each other, third and fourth surfaces connecting the first and second surfaces to each other and opposing each other, and fifth and sixth surfaces connecting the first and second surfaces to each other, connecting the third and fourth surfaces to each other, and opposing each other;
a first external electrode disposed on the third surface of the capacitor body and electrically connected to the first internal electrode;
a second external electrode disposed on the fourth surface of the capacitor body and electrically connected to the third internal electrode; and
third and fourth external electrodes disposed on the fifth and sixth surfaces of the capacitor body, respectively, and electrically connected to the second and fourth internal electrodes,
wherein the capacitor body includes a first capacitor portion formed of a region in which the first and fourth internal electrodes overlap each other and a second capacitor portion formed of a region in which the second and third internal electrodes overlap each other, the first capacitor portion and the second capacitor portion have different capacitances, and
wherein end portions of the second and the fourth internal electrodes facing each other are disposed to be in contact with a same line in a stacking direction.

2. The multilayer electronic component of claim 1, wherein the first internal electrode is exposed through the third surface of the capacitor body, the second internal electrode is exposed through the fifth and sixth surfaces of the capacitor body, the third internal electrode is exposed through the fourth surface of the capacitor body, and the fourth internal electrode is exposed through the fifth and sixth surfaces of the capacitor body.

3. The multilayer electronic component of claim 1, wherein widths of the first and third internal electrodes are smaller than those of the second and fourth internal electrodes.

4. The multilayer electronic component of claim 1, wherein the second internal electrode includes a first body portion overlapping the third internal electrode and spaced apart from an edge of the capacitor body and first and second lead portions extended from the first body portion to be exposed through the fifth and sixth surfaces of the capacitor body, respectively, and the fourth internal electrode includes a second body portion overlapping the first internal electrode and spaced apart from an edge of the capacitor body and third and fourth lead portions extended from the second body portion to be exposed through the fifth and sixth surfaces of the capacitor body, respectively.

5. The multilayer electronic component of claim 1, wherein an interval between the first internal electrode and the second internal electrode and an interval between the third internal electrode and the fourth internal electrode are 50 μm or more.

6. The multilayer electronic component of claim 1, wherein the first external electrode is extended from the third surface of the capacitor body to portions of the first and second surfaces of the capacitor body, and the second external electrode is extended from the fourth surface of the capacitor body to portions of the first and second surfaces of the capacitor body.

7. The multilayer electronic component of claim 1, wherein the first external electrode is extended from the third surface of the capacitor body to portions of the fifth and sixth surfaces of the capacitor body, and the second external electrode is extended from the fourth surface of the capacitor body to portions of the fifth and sixth surfaces of the capacitor body.

8. The multilayer electronic component of claim 1, wherein the third external electrode is extended from the fifth surface of the capacitor body to portions of the first and second surfaces of the capacitor body, and the fourth external electrode is extended from the sixth surface of the capacitor body to portions of the first and second surfaces of the capacitor body.

\* \* \* \* \*